United States Patent [19]

Nodes

[11] Patent Number: 4,569,845

[45] Date of Patent: Feb. 11, 1986

[54] PROCESS FOR THE BATCHWISE PREPARATION OF VINEGAR

[75] Inventor: Franz Nodes, Vienna, Austria

[73] Assignee: Vogelbusch Gesellschaft mbH, Vienna, Austria

[21] Appl. No.: 510,078

[22] Filed: Jun. 30, 1983

[30] Foreign Application Priority Data

Jul. 2, 1982 [AT] Austria ................... 2571/82

[51] Int. Cl.⁴ .................... C12J 1/00; C12P 7/54
[52] U.S. Cl. ..................................... 426/17; 435/140
[58] Field of Search ................ 426/17; 435/140

[56] References Cited

U.S. PATENT DOCUMENTS

| 3,445,245 | 5/1969 | Ebner | 426/17 |
| 4,364,960 | 12/1982 | Kunimatsu et al. | 426/17 |
| 4,456,622 | 6/1984 | Maselli et al. | 426/17 |
| 4,463,019 | 7/1984 | Okuhara et al. | 426/17 |

FOREIGN PATENT DOCUMENTS

| 0098826 | 1/1984 | European Pat. Off. | 426/17 |
| 1063561 | 8/1959 | Fed. Rep. of Germany | 426/17 |

Primary Examiner—Christine M. Nucker
Attorney, Agent, or Firm—Toren, McGeady, Stanger, Goldberg & Kiel

[57] ABSTRACT

In the batchwise preparation of vinegar with approximately from 10 to 16 g of acetic acid/100 ml of vinegar by submersed fermentation of alcohol-containing mashes, for the purpose of a substantial reduction of the long starting time of the submersed vinegar fermentations known hitherto, so as to save energy and reduce the alcohol losses which are particularly high in the starting phase, a starting mash containing acetic acid bacteria with from 4 to 4.5 g of acetic acid/100 ml of mash and from 3 to 3.5% by volume of alcohol is prepared, the temperature is allowed to rise to 28° C. and is held at this level, and after the beginning of fermentation in a starting period high-percentage alcohol-containing nutrient substrate, preferably with approximately 2.5 g of acetic acid/100 ml of substrate and approximately 39% by volume of alcohol is added, and fermentation is carried out.

10 Claims, 2 Drawing Figures

PROCESS FOR THE BATCHWISE PREPARATION OF VINEGAR

TECHNICAL FIELD

The invention relates to the batchwise preparation of vinegar with approximately from 10 to 16 g of acetic acid/100 ml of vinegar by submersed fermentation of alcohol-containing mashes.

BACKGROUND ART

In a known process of this type, to prepare the starting mash either a bacteria-containing vinegar obtained submersed and stored with the access of air to the still surface with an acid content of from 10 to 13 g of acetic acid/100 ml of vinegar and from 0.5 to 1.5% by volume of alcohol which is mixed with alcohol-containing mash with a content of 2 g of acetic acid/100 ml of mash and approximately from 10 to 14% by volume of alcohol is used, or bacteria-free vinegar with a content of approximately from 10 to 12 g of acetic acid/100 ml of vinegar and from 0.0 to 0.5% by volume of alcohol is mixed with alcohol-containing mash with a content of up to 2 g of acetic acid/100 ml of vinegar and approximately from 10 to 14% by volume of alcohol, so that the starting mash has a content of from 6 to 9 g of acetic acid/100 ml of mash and from 4 to 7% by volume of alcohol. In the following the alcohol concentration is always given in percent by volume and the acetic acid concentration in mixed percentages, i.e. in g/100 ml. The sum of these two values is referred to as the total concentration. The starting mash prepared with bacteria-free vinegar according to the second variant is seeded with a ventilated submersed fermentation substrate containing acetic acid bacteria. The addition of the seeding substrate is carried out in the ventilated starting mash, the ventilation thereof being continued without interruption. After reaching an alcohol concentration close to zero, part of the vinegar prepared is removed from the fermentation tank and replaced by fresh mash.

It was previously thought that an acetobacterial strain produced by adaptation over many years would retain its properties, i.e. compatibility of high total and acetic acid concentrations, only in a continuous submersed high-percentage fermentation with a total concentration above 10%, or if vinegar is discharged from a fermentation of this type before the end of fermentation with an acetic acid content of approximately from 10 to 13 g/100 ml and from 0.5 to 1.5% by volume of alcohol and this untreated vinegar is stored with access of air to the still surface.

As a result of the unfavorable conditions of existence for the acetobacteria during the storage periods of differing duration, such as for example high acetic acid concentrations, low residual alcohol content, minimal nutrient provision, and poor oxygen supply, the starting time of a fermenter using a so-called "seeding vinegar" stored in this way for the preparation of starting mash with an acetic acid content of from 6 to 9 g/100 ml and from 4 to 7% of alcohol usually amounts to between 7 and 14 days, the starting time amounting to up to 20 days with a high starting total concentration, e.g. of 13%, and a corresponding age of the seeding vinegar.

When using filtered, high-percentage vinegar and corresponding mash with an acetic acid content of up to 2 g/100 ml and approximately from 10 to 14% of alcohol for the preparation of starting mash with from 6 to 9 g of acetic acid/100 ml and from 4 to 7% of alcohol and seeding with from 2 to 5 l of substrate fermenting submersed per 10,000 l of starting mash, the starting time of the fermenter still amounts to from 5 to 10 days depending upon the level of the starting mash total concentration.

DISCLOSURE OF THE INVENTION

The object of the invention is to provide a process of the type described above which will allow the long starting time of a submersed vinegar fermentation to be substantially reduced relative to the known processes, in order to save energy and to reduce the alcohol losses which are particularly high in the starting phase.

This object is attained according to the invention in that a starting mash containing acetic acid bacteria with from 4 to 4.5 g of acetic acid/100 ml of mash and from 3 to 3.5% by volume of alcohol is prepared, the temperature is allowed to rise to 28° C. and is held at this level, whereupon after the beginning of fermentation already in the starting period high-percentage alcohol-containing nutrient substrate, preferably with approximately 2.5 g of acetic acid/100 ml of substrate and approximately 39% by volume of alcohol, is added and the fermenter content ferments. By virtue of a fermentation process of this type the acetobacterial strain used may rapidly again put into effect the properties adapted thereto, such as compatibility of a high acetic acid concentration and a high total concentration, so that a considerable reduction of the starting phase is achieved.

The supply of high-percentage alcohol-containing nutrient substrate may advantageously be carried out in stages until a total concentration of from 10 to 16% is achieved, so that it is easy for the microorganisms to adjust again to the high concentrations. In this connection, the total concentration may be increased by the supply of the nutrient substrate in stages by from 1 to 1.5% in each case, so that it becomes possible for there to be no retardation of the fermentation rate. It has thus been found that the microorganisms, contrary to what was previously thought, retain their adapted properties even over a prolonged period of time in a starting mash with an acetic acid content of 4.5 g/100 ml and an alcohol content of 3.4%. In order to prepare the starting mash, alcohol-containing mash, where appropriate mixed with additional nutrients, with a low total concentration may be added to a fermentation substrate, which has fermented and originates in a vinegar fermentation, with from 0.1 to 0.2% by volume of alcohol and from 10 to 16 g of acetic acid/100 ml of substrate with ventilation, until the acetic acid to alcohol ratio amounts to approximately 1:1 and the total concentration amounts to approximately from 7.8 to 8%, whereupon the fermentation is continued while air is supplied until the acetic acid to alcohol ratio amounts to approximately 1.2:1. The reduction of the total concentration, the relatively favourable acid to alcohol ratio of from 1.1 to 1.2:1, and the abundant nutrient supply lead to an increased formation of cellular contents in the acetic acid bacteria. In this connection the starting mash produced may meanwhile be stored in a storage tank with periodic ventilation. In this way and in conjunction with an increased formation of cellular contents a major part of the acetic acid bacteria acquires its propagation capacity. The interior of the starting mash storage tank is provided with an annular duct of acid-resistant steel which, over its entire surface, comprises bores of defined diameters in order to be able to supply and distribute air in an oil-free manner by means of a fan or a compressor into the starting mash to be stored. The air supply is performed automatically, 1 to 10 Nm$^3$ (m$^3$ at normal temperature and pressure) of air being supplied for 1 to 10 minutes in each case at intervals of from three minutes to six hours. The interval time, the duration of ventilation, and the rate of ventilation are dependent upon the anticipated storage time of the starting mash. In order to prepare the starting mash, however, pasteurized alcoholic vinegar with a content of 4.45 g of acetic acid/100 ml of alcoholic vinegar and 3.4% by volume of alcohol may be mixed with mash containing acetic acid bacteria and with bacterial nutrients, so that increased formation of cellular contents is rapidly achieved at the same time. The supply of the high percentage alcohol-containing nutrient substrate may be initiated when a residual alochol content of approximately from 0.4 to 0.6% by volume is achieved, with the result that the fresh nutrient substrate is introduced into the still fully fermenting mash, so that the microorganisms do not require any renewed starting phase.

BEST MODES OF CARRYING OUT THE INVENTION

Example 1

20,000 l of vinegar were discharged from a fermenter in a state of full fermentation and 8,500 l of spirit mash with an acetic acid content of 0.36 g/100 ml and an alcohol content of 5.54% were added. The contents of the fermenter were then further fermented with a constant ventilation intensity of 140 Nm$^3$/h until an acetic acid content of 4.5 g/100 ml and an alcohol content of 3.5% were attained. Then the entire quantity was discharged into a starting mash storage tank where this starting mash was stored with access of air, 1 Nm$^3$ of air being drawn into the starting mash by way of the annular duct for a minute in each case six times per day.

10,000 l of this starting mash produced in this way with an acetic acid concentration of 4.5 g/100 ml and 3.5% by volume of alcohol were pumped after a storage period of two months into a fermenter in order to start vinegar fermentation at a temperature of 22° C. and were ventilated at 10 Nm$^3$/h. After one day the temperature in the fermenter had already automatically increased to 28° C. On the third day the increase in the vinegar content of the mash began. On the morning of this day the ventilation quantity had risen to 30 Nm$^3$/h and in the evening of the same day had risen to 50 Nm$^3$/h, so that on the fourth day the acetic acid content had already risen to 7.05 g/100 ml and the alcohol content had fallen to 1.7%. Then, 400 l of denaturate which had an acid content of 2.5g/100 ml and an alcohol content of 39% by volume was added, so that an acetic acid concentration of 7.0 g/100 ml and an alcohol content of 1.9% by volume was produced. This mash was then fermented, the ventilating quantity being increased to 60 Nm$^3$/h. After a few hours a further 450 l of denaturate and 7.5 kg additional bacterial nutrients were added. This mash was left to ferment for a few hours, and then a further 550 l of denaturate was added and the ventilating quantity was increased to 70 Nm$^3$/h. At the beginning of the fifth day a further 450 l of denaturate and 7.5 kg additional bacterial nutrients were added and the mash was further fermented until the acetic acid concentration had reached 12 g/100 ml and the alcohol content had reached approximately 1% by volume. Then 6000 l of spirit mash with an acetic acid content of approximately 0.8 g/100 ml and an alcohol content of 12.5% by volume was added while increasing the ventilating quantity to 105 Nm$^3$/h at the same time. At the beginning of the sixth day a further 6150 l of spirit mash of the same composition was added and the ventilation increased to 140 Nm$^3$/h. The fermenter now contained the entire filling quantity of 24,000 l. Further fermentation was carried out until the mash had an acetic acid content of approximately 12.5 g/100 ml and an alcohol content of 0.1%, and then 8000 l of finished vinegar with a composition similar to the composition of the mash was discharged. After that, 8000 l of fresh spirit mash was added and the mash was fermented. Fermentation was now continued with the same acidification capacity. The discharges were then always carried out with 0.1% by volume of residual alcohol. The alcohol content after each addition of spirit mash was set to a maximum of 3.5% by volume.

Example 2

10,000 l of starting mash with 4.45 g/100 ml of acetic acid and 3.4% by volume of alcohol were made up from pasteurized alcoholic vinegar and normal mash directly in the fermenter. 15 kg of bacterial nutrient, which consisted of glucose, monoammonium phosphate, potassium sulphate, magnesium sulphate, organic components, and trace substances, was added to the starting mash.

After the starting mash was heated to 28° C. the ventilated contents of the fermenter were seeded with 5 l of fermenting seeding substrate containing 4.38 g/100 ml of acetic acid and 3.26% by volume of alcohol. An increase in acetic acid of 0.1 g/100 ml of acetic acid could already be detected 36 hours later, which means that the vinegar fermentation had already started. After a further 20 hours the acetic acid content amounted to 7 g/100 ml and the residual alcohol content 0.48% by volume. The first addition of 450 l of denaturate with 2.5 g/100 ml of acetic acid and 39% by volume of alcohol was then carried out. The further denaturate additions were carried out in each case with a residual alcohol content of from 0.4 to 0.8% by volume, so that an increase in the total concentration took place in stages. This procedure was repeated frequently until a total concentration of 13.2% was achieved in the fermentation substrate. A necessary nutrient quantity equivalent to the alcohol quantity was taken into consideration in the denaturate additions. The subsequent production of high-percentage vinegar was continued using spirit mashes with a 14 to 16% total concentration.

In both of the above examples the alcohol values of the starting phase and the fermentation charges normally carried out thereafter while using spirit mashes with from 0.8 to 0.96 g/100 ml of acetic acid and from 12 to 15.4% by volume of alcohol were continuously determined and indicated with a continuously operating gas analysis device. The measurement principle of this device is based upon the change of the electrical resistance of a gas sensor formed by a semiconductor as a function of the alcohol concentration. The gas sensor is disposed in a measuring probe which is built into the substrate space of the vinegar fermenter. The alcohol present in the fermentation substrate permeates through a diaphragm membrane finger immersed in the fermentation substrate into a carrier gas, by means of which the alcohol that has permeated in is supplied to the gas sensor.

A microcomputer, in which the constants are stored and to which varying data may additionally be freely fed, is incorporated in the gas analysis device. The said data are the desired limits, such as residual alcohol values for example.

The use of the gas analysis device makes it possible, with the aid of two limits which may be freely fed in, to keep the residual alcohol content constant with only slight deviations at for example 0.1% by volume during the discharge lasting approximately 90 minutes.

Limit I introduces the discharge, for example at 0.12% by volume of residual alcohol content, until the desired adjustable minimum filling state of the fermenter has been achieved. The duration of the discharge amounts to approximately 90 minutes depending upon the size of the fermenter, the cross-section of the duct, and the delivery capacity of the pump. Since the fermentation and therefore the acid formation continue during the discharge period, namely depending upon the ventilation rate with an hourly formation of from 0.15 to 0.25 g/100 ml of acetic acid, in the case of the anticipated discharge duration the fermentation would come to an end after 30 minutes in the least favorable case, and this would result in a complete cessation of fermentation. Therefore Limit II is set for example at 0.1% by volume of residual alcohol content. As soon as the latter falls below this value in the mash, alcohol-containing mash is added by way of an adjustable pulse-pause time function element, namely until a residual alcohol content of 0.12% by volume, i.e. Limit I, is achieved again. This procedure is frequently repeated until the minimum filling state contact of the fermenter is reached, which switches off the discharge pump and initiates the addition of fresh spirit mash. Additions are then made up to the maximum filling state, the course of the addition procedure being temperature-controlled.

An additional Limit III, which is set above the temperature-controlled mash addition, limits the maximum alcohol concentration during or after the mash addition to 3.5% by volume, provided the maximum filling state of the fermenter has not already been reached. By limiting the alcohol content to 3.5% by volume the "alcohol blow-off losses" are reduced, which arise through the ventilation of the fermentation substrate, since at this time the alcohol content of the fermentation substrate is at its highest.

If no gas analysis device is available, the moment of discharge is calculated on the basis of the acidification rate and the discharge of the vinegar prepared is released by a time clock. The required quantity of mash is supplied in this case by means of adjustable pulse-pause time function elements. These intervals must likewise be calculated depending upon the acidification rate of the fermentation substrate or depending upon the alcohol concentration of the mash, in order to keep the alcohol content constant with sufficient accuracy during discharge.

| Example of Calculation: | |
|---|---|
| Fermenter type 600 | |
| Filling volume: | 24,000 l |
| Hourly increase in acid until the end of fermentation: | 0.25 g/100 ml acetic acid |
| hourly alcohol treatment of the fermenter: | $\frac{24000 \text{ l} \times 0.25\%}{100} = 60 \text{ l pure alcohol}$ |

| -continued | |
|---|---|
| Example of Calculation: | |
| Fermenter type 600 | |
| alcohol content of the mash: | 12.0% by volume, $\frac{60 \times 100}{12} =$ 500 l of mash per hour are treated. |

With a discharge period of 90 minutes this corresponds to a mash quantity of 750 l which must be added, in order to keep the alcohol content constant in the fermentation substrate during discharge, e.g. at approximately 0.1% by volume.

The addition of denaturate, alcohol, or normal spirit mash is carried out by way of an insertion nozzle, which is disposed in the air suction duct leading to the ventilating device above the upper plate of the container.

One preferred embodiment of a fermenter for performing the process according to the invention is illustrated in the accompanying drawings.

PREFERRED EMBODIMENT

Figure 1:
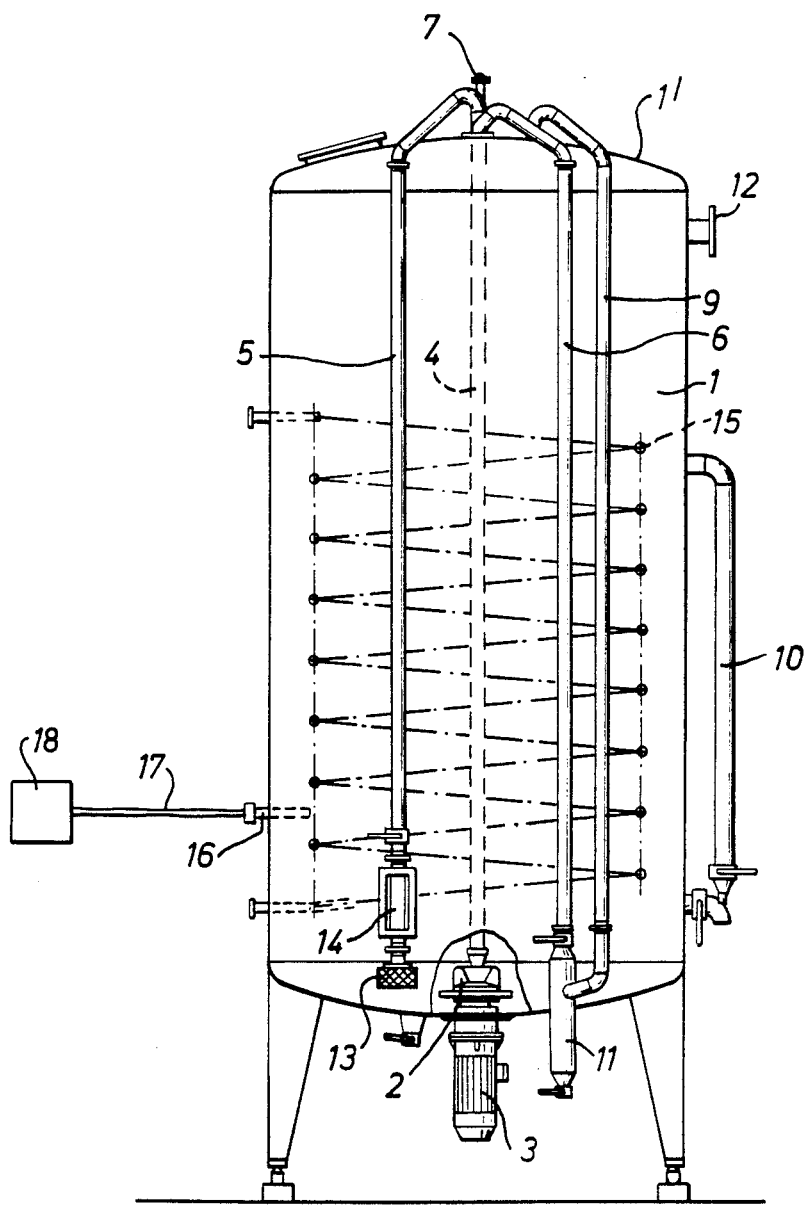
FIG. 1 is a diagrammatic view of the fermenter.
Figure 2:
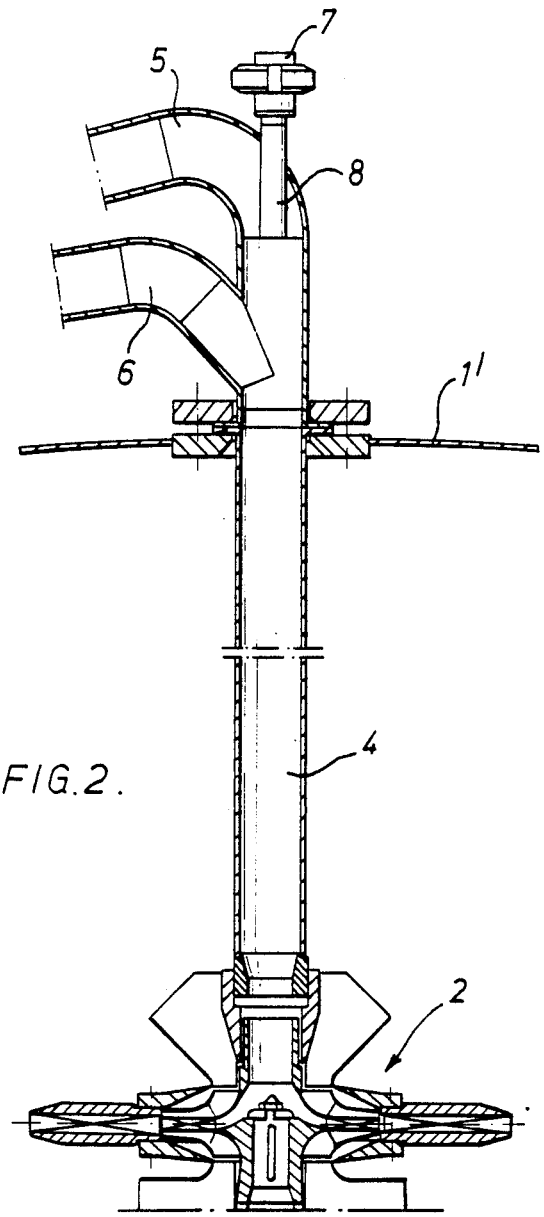
FIG. 2 is a detail illustrating the air supply with the insertion nozzle and the ventilator.

The fermenter 1 is provided with a ventilating device 2 which is driven by a motor 3 and to which air is supplied by way of a central duct 4. A fresh air supply duct 5 and a return air duct 6 open into the said air supply duct 4 above the upper plate 1' of the fermenter. A further duct 7, through which spirit mash, denaturate, 40% alcoholic vinegar, or the like are fed into the fermenter by way of an insertion nozzle 8, additionally opens into the said air supply duct 4. In this way the mash reaches the ventilator already mixed with air, so that intimate mixing of the mash and the air immediately takes place in the fermenter contents. The circulating air introduced into the air supply duct 4 by way of the duct 6 is sucked out of the gas space of the fermenter 1 by way of a duct 9 emerging from the upper plate 1' of the fermenter. The foam removal duct is designated 10. The excess discharge air is led off by way of a discharge duct (not shown) connected to a socket 12. An air filter 13 and an air volume measuring device 14 are arranged upstream of the fresh air supply duct 5. In order to maintain the fermentation temperature of 28° C. the fermenter 1 is provided with a conventional cooling device 15.

For monitoring the course of fermentation there is provided a probe 16 which projects into the interior of the fermenter 1 and which feeds, by way of a measurement circuit 17, the data found into a gas analysis device 18, which then controls the discharge of the fermented mash and the addition of fresh mash.

I claim:
1. A process for the batchwise preparation of vinegar with approximately from 10 to 16 g of acetic acid/100 ml of vinegar by submersed fermentation of an alcohol-containing mash, wherein the improvement comprising the sequential steps of supplying to a fermenter a starting mash containing acetic acid bacteria with from 4 to 4.5 g of acetic acid/100 ml of mash and from 3 to 3.5% by volume of alcohol, raising the temperature of the starting mash to 28° C. and holding the temperature at this level, after the beginning of fermentation in a start- ing period adding a nutrient substrate containing a higher percentage of alcohol than the starting mash, and fermenting the contents of the fermenter.

2. The process of claim 1, in which the said nutrient substrate contains approximately 2.5 g of acetic acid/100 ml and approximately 39% by volume of alcohol.

3. The process of claim 1, in which the addition of the said nutrient substrate is carried out in stages until a total concentration of alcohol and acetic acid of from 10 to 16% is achieved.

4. The process of claim 3, in which the total concentration is increased by the addition of the said nutrient substrate in stages by from 1 to 1.5% in each stage.

5. The process of claim 1, in which the starting mash is prepared by adding alcohol-containing mash, mixed with additional nutrients, with a low total concentration to a fermentation substrate which has fermented and originates in a vinegar fermentation and which contains from 0.1 to 0.2% by volume of alcohol and from 10 to 16 g of acetic acid/100 ml of substrate, with ventilation, until the acetic acid to alcohol ratio amounts to approximately 1:1 and the total concentration amounts to approximately from 7.8 to 8%, and continuing fermentation while air is supplied until the acetic acid to alcohol ratio amounts to approximately 1.2:1.

6. The process of claim 5, in which the starting mash produced is stored in a storage tank with periodic ventilation, to allow growth of acetic acid bacteria before being supplied to the fermenter.

7. The process of claim 1, in which the starting mash is prepared by mixing together pasteurized alcoholic vinegar containing 4.45 g of acetic acid/100 ml and 3.4% by volume of alcohol, mash containing acetic acid bacteria, and bacterial nutrients.

8. The process of claim 1, in which the addition of the said nutrient substrate is initiated when a residual alcohol content of approximately from 0.4 to 0.8% by volume is achieved.

9. The process of claim 1, wherein the temperature is raised by allowing the temperature to increase to 28° C. during initial fermentation.

10. The process of claim 1, wherein the temperature is raised by heating the starting mash to 28° C. before initial fermentation.

* * * * *